United States Patent Office 2,853,470
Patented Sept. 23, 1958

2,853,470
MALEIC AND FURFURAL KETONE REACTION PRODUCTS

Peter L. Rosamilia, Newark, N. J., assignor to Harvel Research Corporation, a corporation of New Jersey No Drawing. Application April 20, 1955
Serial No. 502,721

13 Claims. (Cl. 260—63)

This invention relates to novel methods for producing resinous reaction products and to the novel products produced thereby as well as to novel compositions in which said novel products are components. In one of its more specific aspects, the invention is directed to novel reaction products of (I) maleic acid and (III) reaction products produced by reacting (IV) an agent containing a reactive methylene group and (II) furfural-ketone reaction products and derivatives thereof.

Among some of the ketones which may be employed to produce said furfural-ketone reaction products are those having two hydrogen atoms on an alpha carbon examples of which are acetonemethyl ethyl ketone, methyl isobutyl ketone, diacetone alcohol, mesityl oxide, isophorone, cyclohexanone, phorone, acetophenone, methyl n-amyl ketone, acetonyl acetone (hexandione 2,5) diethyl ketone, di-isobutyl ketone, etc. By the term maleic acid as employed herein, I mean either maleic acid or its anhydride. The following are specific examples of some of the agents (IV) containing a reactive methylene group which may be employed in the practice of this invention: formaldehyde, paraformaldehyde, trioxane, furfuraldehyde, glyoxal, polymerized glyoxal, acrolein, polymerized acrolein, acetaldehyde, etc.

The furfural-ketone reaction products may be produced by following the procedure known to the art by reacting under alkaline conditions, furfural with one or a combination of two or more of said ketones to produce an organic reaction mass having a quantity of resin therein measuring at least 5% by weight of the organic reaction mass. Generally, the furfural and ketone are mixed with each other and then there is added thereto a quantity of an alkaline material such as an aqueous solution of sodium hydroxide, potassium hydroxide, lime or the like. These three components are mixed with each other in an autoclave or closed unit and in most cases after the mixture takes place, an exothermic reaction occurs and the pressure within the autoclave will rise. After the exothermic reaction has subsided, the initial reaction is practically complete. In order to assure complete reaction and high yields, the mass in the autoclave is externally heated to maintain it in the state of boiling for a period of time depending upon the viscosity desired of the resultant organic reaction mass which may vary from a fairly thin liquid to a solid at room temperature. The viscosity of the organic reaction mass after dehydration is at least 50 cps. at 25° C. and in all cases the organic reaction mass is a liquid at 250° F.

These furfural-ketone reaction masses which when dehydrated are liquid at 250° F.–325° F. and for some purposes I prefer to employ those which have a viscosity between about 50 and 20,000 cps. at 25° C. and in all instances contain compounds which are either mono- and combinations of mono- and di-furfurylidene ketone and/or polymers thereof, said compounds having the following formula:

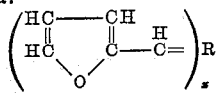

wherein $x$ is a whole number selected from the group of 1 and 2, and R is a ketone lacking two of the hydrogen atoms normally on either one or both of its alpha carbons. These compounds are produced as a result of reaction between the furfural and ketone wherein two hydrogens on the alpha carbons unite with the oxygen of the furfural to split off water. This reaction also provides an amorphous or resinous material. The quantity of said resinous material present in all of the reaction masses varies and is dependent upon the time magnitude of boiling of the reaction mass and is approximately 5% or more of the organic reaction mass by weight, and in general measures about 5%–80% by weight of the organic reaction mass when in liquid condition.

The following specific example for producing the furfural-ketone reaction mass, which will be identified herein as product A, is given merely by way of illustrating in general a method for producing the furfural-ketone reaction masses, and also shows various fractions which may be obtained therefrom.

Example A

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical agitator or stirrer which may be in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about 3 or 4 minutes. After about 10 minutes, there is added to the mass in said autoclave another charge consisting of 40 lbs. furfuraldehyde and 24 lbs. acetone. Then to the mass is added a second increment of said sodium hydroxide solution equal in volume to the first addition. After a few minutes the temperature of the mass, due to the exothermic reaction, will rise to approximately 165–170° F. The foregoing steps are repeated four more times so that the amount of furfuraldehyde and acetone added to the autoclave are equal to 240 lbs. and 144 lbs. respectively, and all of the initially prepared aqueous solution of sodium hydroxide has been added. After the last addition of sodium hydroxide, the temperature of the mass within the autoclave will have stabilized to about 180–195° F. Then the mass within the autoclave may be heated by means of a steam coil located therein and through a jacket carried thereby to maintain the temperature of the mass between approximately 185–195° F. for about 30 minutes in order to complete the reaction and to obtain high yields. The steam is cut off from the coil and jacket, and then there is added thereto an aqueous solution of sulphuric acid in quantity sufficient to render the mass practically neutral. In this instance there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the same to a temperature of 220° F. with or without vacuum yielding approximately 300 lbs. of dehydrated substantially neutral material known as product A whose viscosity at 25° C. is 92 cps. and having a specific gravity of 1.150 at 25° C.

When product A is distilled at a pressure of approximately 0.1 mm. of mercury pressure, a fraction (37%) weighing approximately 110 lbs. comes off at temperature in the range of 70–85° C. and is hereinafter known as product A–I and leaving a residue known hereinafter as product R–I; and a fraction (47%) measuring approximately 140 lbs. comes off in the temperature range of 150–165° C. and is hereinafter known as product A–II. The residue measuring approximately 50 lbs. is a brittle solid on cooling to room temperature. Analysis of product A–I established a carbon content of 70.30% and hydrogen of 5.48% which corresponds to the carbon and hydrogen values of monofurfurylidene-acetone having the following formula:

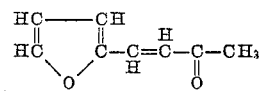

Analysis of product A–II established a carbon content of 73.07% and a hydrogen content of 4.58% corresponding to the carbon and hydrogen values of difurfurylidene-acetone having the following formula:

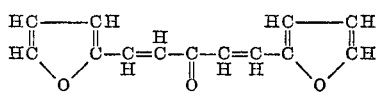

A number of other specific examples for the production of these various furfural-ketone reaction masses and fractions such as products A–I, A–II and R–I may be found in the U. S. Patent 2,516,317, issued July 25, 1950, as well as in the first part of Examples 1–20 of U. S. Patent 2,363,829, issued November 28, 1944, and the first part of Examples 1–16 of U. S. Patent 2,461,510, issued February 15, 1949.

These various materials, liquid at 325° F., (a) furfuralketone reaction masses, (b) residues of said masses produced by the heat distillation thereof and measuring by weight at least 10% and generally 15%–95% and preferably at least 60% of said masses, (c) monofurfurylidene-ketone, (d) difurfurylidene-ketone and (e) homopolymers of (a), (b), (c) and (d) respectively may be reacted alone or in combination of two or more of them with one or a combination of two or more of said agents containing a reactive methylene group to provide resinous reaction products (III) liquid at 325° F to be employed as reactants in the practice of this invention. Said (a)–(d) respectively may be homopolymerized in a number of different ways: For example, by heating them at elevated temperatures of about 180–260° F. in factory practice while in the presence of an acidic or alkaline agent or catalyst, such as diethyl sulphate, sulphuric acid, hydrochloric acid, phosphoric acid, zinc chloride, boron trichloride or the like, sodium hydroxide, potassium hydroxide, lime, sodium carbonate or the like. When such homopolymerization is conducted under acidic conditions, the amount of acidic catalyst employed is such that the pH of the mix is at least 8 and for most purposes in the range of about 8.5–13. A specific method, given merely for the purposes of illustration, which may be employed to produce said homopolymers of (a)–(d) respectively is to charge a quantity of any of them into a container and then there is added thereto a quantity of catalyst either alkaline or acidic to impart a pH to said mix within the ranges heretofore set forth. Then such mix is maintained at approximately 250° F. until a solution of the resultant homopolymers in an equal weight of acetone has a viscosity in centipoises at 25° C. at least 100% greater than that of a solution of the corresponding original product (a)–(d) respectively in an equal weight of acetone. These homopolymers of (a)–(d) are in all cases liquid at 325° F.

Other reactants which may be employed in the practice of this invention are the resinous reaction products liquid at 325° F. and produced by reacting one or a combination of two or more of said agents containing reactive methylene groups with said (a)–(e) respectively which have been partially hydrogenated by employing the procedure set forth in the U. S. patent to M. T. Harvey, Nos. 2,600,403 and 2,600,764, both issued June 17, 1952, which patents in their entirety are made part hereof. In general for partially hydrogenating said (a)–(e) respectively, I prefer that they first be rendered neutral and substantially completely dehydrated.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120° C. the external source of heat is removed, hydrogen gas is admitted thereto to provide a pressure of 25–250 lbs. per sq. in. whereupon hydrogenation takes place and is an exothermic reaction. The addition of the hydrogen is continued whereupon the temperature of the mass rises and is maintained at a level no greater than 250 lbs. per sq. in. and generally between 30–75 lbs. per sq. in. The hydrogen is continuously added under the aforesaid conditions until the amount of added hydrogen is approximately 70–340 cu. ft. measured at 20° C. and 760 mm. pressure. The hydrogen added is approximately 15–60% of the quantity of hydrogen necessary for complete saturation of all the carbon to carbon double bonds thereof. The hydrogen is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50–100% saturated with hydrogen, with 0.50% saturation with hydrogen of the carbon to carbon double bonds in the furane ring.

When the mass to be hydrogenated is of a very high viscosity, for example over 20,000 cps. at 25° C., I first dissolve the mass in a solvent, such as a high molecular weight ketone, and then hydrogenate under the aforesaid conditions.

The following examples illustrate methods for producing various partially hydrogenated materials employed for the production of reactants in the practice of this invention.

*Example B*

40 lbs. of product A is placed in a 10-gallon closed unit equipped with a high speed propeller. Then 1 lb. of a catalyst and carrier combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per sq. in. Hydrogen is continuously admitted to the mass and hydrogenation takes place exothermically and now the external source of heat is removed therefrom. By controlling the speed of addition of the hydrogen to the mass, the temperature is maintained at approximately 200°

C. and the pressure of approximately 50 lbs. per sq. in. The temperature during hydrogenation may also be controlled by external cooling. The hydrogen addition is terminated when no more hydrogen is taken up under these conditions within a period of about 30 minutes. The quantity of hydrogen taken up in this particular hydrogenation step apparently due to early poisoning of the catalyst amounted to approximately 145 cu. ft. which corresponds roughly to the quantity of hydrogen required to saturate only the unsaturated carbon to carbon atoms outside of the furane ring.

The same procedure may be followed with product R–I to partially hydrogenate it to the same extent as product A, and such partially hydrogenated product R–1 is hereinafter referred to as product HR–I. The same procedure may also be followed with products A–I, A–II and R–I respectively which have been homopolymerized to such a degree that a solution thereof in an equal weight of acetone has a viscosity in centipoises at 25° C. equal to 200% that of a like solution of corresponding original product employed to provide partially hydrogenated products hereinafter known as products HPA, PHA–I, HPA–II and HPR–I.

This hydrogenated product A, known hereinafter as product B, is still a thin liquid and may be distilled if desired to separate various fractions thereof. By distilling this hydrogenated product B at 0.3 mm. of mercury pressure a fraction distilled off up to 100° C. and was collected and amounted to 32%; a second fraction amounting to 41% distilled off and was collected at 120–170° C. That fraction which distilled off up to 100° C. is hereinafter known as fraction B–1 and consisted essentially of a compound having the following formula:

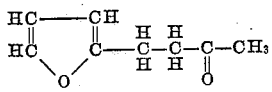

The second fraction which distilled off at 120–170° C. is hereinafter known as fraction B–2 and consisted essentially of a compound having the following formula:

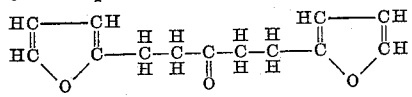

The residue known as B–3 upon cooling was a brittle black solid at room temperature.

Example C

By using the same procedure as that set forth in Example A and substituting 180 lbs. of methyl ethyl ketone for the 144 lbs. of acetone and then hydrogenating according to Example B terminating the hydrogen addition when approximately 150 cu. ft. of hydrogen have been taken up, there may be produced a novel hydrogenated product known hereinafter as product C. Product C may be distilled to provide fractions C–1 and C–2 respectively, chiefly consisting of the following compounds:

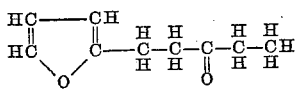

and

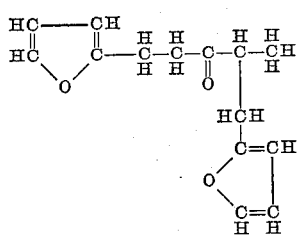

and a resinous residue, C–3 of more than 5% of the hydrogenated mass.

Example D

By using the same procedure as that set forth in Example C and substituting 240 lbs. of diacetone alcohol for the 180 lbs. of methyl ethyl ketone, there may be produced a novel hydrogenated product known as product D. This hydrogenated product D may be distilled to provide fractions D–1 and D–2 respectively, consisting chiefly of the following compounds:

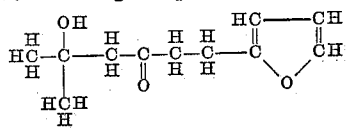

and

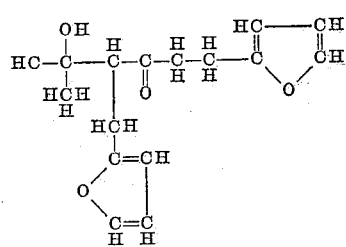

and a resinous residue D–3 of more than 5% of the hydrogenated mass.

Example E

Following the same procedure as that set forth in Example B and using fresh catalyst and terminating the hydrogenation after approximately 70, 100, 150, 175, 210 and 235 cu. ft. of hydrogen were taken up in six different 40 lb. batches of product A, I obtained products E–1, E–2, E–3, E–4, E–5, and E–6, differing from each other in the degree of hydrogen saturation.

Example F

Following the same procedure as that set forth in Example B and employing fresh catalyst, 235 cu. ft. of hydrogen were taken up in a 40 lb. batch of product A. Then the same amount of fresh catalyst, .25 lb. powdered nickel, was added thereto and hydrygenation continued until a total of 340 cu. ft. of hydrogen was taken up. This product is known as product F.

Example G

Following the same procedure for hydrogenating as that set forth in Example B and employing fraction A–1 in place of product A and terminating the hydrogenation after 1.3 and 1.8 moles proportionately of hydrogen were taken up by 1 mole proportion of said fraction, approximately 95 and 130 cu. ft. of hydrogen per 40 lbs. of fraction A–1. The hydrogenation above the 1.3 mole proportion proceeded with difficulty. These two hydrogenated products are G–1 and G–2 and were respectively about 43% and 60% hydrogenated at the carbon to carbon double bonds.

Example H

Following the same procedure for hydrogenating as that set forth in Example B and employing fraction A–2 in place of product A, 1 to 4 moles of hydrogen were taken up. Above 2 moles of hydrogen addition, additional increments of nickel catalyst were used. Various samples of 1, 2, 3, and 4 moles of hydrogen addition products are known as H–1, H–2, H–3 and H–4, respectively, and respectively were approximately 15, 30, 50 and 65% hydrogen saturated at the carbon to carbon double bonds.

Examples I–K

Employing the same procedure as that set forth in Example B and employing respective residues measuring by weight about 60% of product A, furfural-methyl ketone reaction mass of Example C, furfural-diacetone alcohol reaction mass of Example D, there were obtained respective partially hydrogenated products I, J and K.

Said partially hydrogenated products, examples of which are illustrated in Examples A–K may respectively be homopolymerized and said partially hydrogenated products whether or not homopolymerized or thickened may be reacted with an agent containing a reactive methylene group to provide reactants employed in the practice of this invention. Said homopolymerization or thickening may be effected by the use of an acidic catalyst, generally with the use of heat. Any of the acidic catalysts may be employed for this purpose and for most purposes in amount sufficient to provide a mix having a pH no greater than 4 and for most purposes .3–3. While under the lower pH conditions the homopolymerization may proceed at room temperature, it is preferable that external heat be used and the high pH, for example 180–450° F. and pH about 2–2.5.

In any case, the acid catalyzed mass is maintained within said temperature range until the polymerization or thickening has reached the desired degree as evidenced by an increase in viscosity which in all cases is at least 100% greater than the viscosity of the material treated before polymerization or thickening. In all cases, the heat is removed so that all of the acid polymerized materials so produced are preferably liquids or pourable at room temperature and in any event are liquid at 325° F., that is to say, that the heat is removed before any of them is converted to the solid infusible state and all of these products will hereinafter be known as acid-polymerized materials. Various specific examples of said acid polymerized unhydrogenated materials in the liquid state at room temperature may be found in said U. S. Patent No. 2,461,510 and other examples of said polymerized unhydrogenated materials may be found in U. S. Patent No. 2,516,317, reference is hereby made to said printed publications.

Reference is also made to said Patents No. 2,600,403 and 2,600,764 showing various liquid acid polymerized hydrogenated materials liquid at 325° F., examples of which are as follows:

Example L

All of the various specific hydrogenated products hereinbefore disclosed were separately mixed with diethyl sulfate in the proportion of 10–40 cc. of the latter for each 6 lbs. of the former, the quantity of diethyl sulfate employed being greater when employed with the more highly hydrogen saturated products. In factory practice, 10 cc. of diethyl sulphate was employed with those products which took up 150 cu. ft. of hydrogen per 40 lbs., 20 cc. of diethyl sulfate for those which took up 150–250 cu. ft. of hydrogen per 40 lbs., etc. Each mixture was heated and while being constantly stirred was maintained at a temperature of 260–325° F. whereupon an exothermic reaction took place and the mass thickened rapidly. When the mass has attained the desired viscosity in the course of this exothermic reaction, it is rapidly cooled in any convenient manner to stop the reaction. The reaction is preferably stopped at that stage of polymerization where the product is a liquid resin capable of being converted to the solid state upon extended heating at 300° F. and has a viscosity at 25° C. of at least 100% greater than that of the unthickened product, or if the partially hydrogenated product is a solid, polymerization is stopped when a 50% acetone solution thereof has a viscosity at 25° C. about 200% that of a like solution of such product before polymerization.

The reactants (III) which may be employed in the practice of this invention are the resinous reaction products produced by reacting one or more of agents (IV) with one or more of materials (II) selected from the group of materials (a)–(i) herein defined. In general the reaction of (IV) and (II) is carried out under acidic conditions by adding thereto an acidic agent, such as those disclosed herein to impart thereto a pH preferably of about 3.5 or below. In factory practice the pH is adjusted to approximately 1.5–2.5 and heat is applied to maintain the mass at about 250–400° F. to provide resinous reaction products (III) either liquid or solid at room temperature and in all cases liquid at 325° F. The ratio of (II) to (IV) by weight may vary over a very wide range depending upon materials (IV) and (II) employed and in general may be 100 parts of (II) to 1–10 parts of (IV).

According to this invention novel resinous reaction products (X) either in the liquid or solid state may be produced by heat reacting (I) maleic acid and (III) a resinous organic reaction material liquid at 325° F. and produced by reacting under acidic conditions, (IV) an agent selected from the group consisting of formaldehyde, paraformaldehyde, trioxane, furfuraldehyde, glyoxal, polymerized glyoxal, acrolein, polymerized acrolein, acetaldehyde and mixtures of two or more of them and (II) a material, liquid at 325° F. and selected from the group consisting of (a) organic reaction masses produced by reacting furfuraldehyde and a ketone having at least two hydrogen atoms on an alpha carbon, at least 5% by weight of each of said reaction masses being a resinous material, (b) residues of (a) produced by the heat distillation of (a) and measuring by weight at least 10% and preferably 60% of (a), (c) monofurfurylidene-ketone, (d) difurfurylidene-ketone, (e) homopolymers of (a)–(d) respectively, (f) partially hydrogenated homopolymers (e), reaction masses (a) and residues (b), (g) partially hydrogenated monofurfuralketone (h) partially hydrogenated difurfurylidene-ketone, (i) residues of partially hydrogenated (a), said residues produced by the heat distillation thereof and measuring by weight at least 10% and preferably at least 60% thereof, and (j) homopolymers of (f)–(i) respectively, said materials (f), (g) and (h) produced by partially hydrogenating materials (a)–(e) to saturate them with hydrogen to an extent equal to approximately 15–65% of that required to saturate all of the carbon to carbon double bonds in said materials (a)–(e).

In general this reaction is carried out by heating a mixture of (I) maleic acid and one or a combination of two or more of organic reaction products (III) with the ratio by weight of (I) to (III) being preferably in the ratio range by weight of 5–50 parts of (I) to 100 parts of (III). This mixture is heated and maintained at a temperature of 250–400° F. to provide resinous reaction products, known hereinafter as products (X), which may be in either the liquid or solid state depending upon the degree and time of heating, and in all cases are liquid at 300° F. Thus a wide variety of different products (X) may be produced depending upon the aforesaid factors and also the reactants employed with the maleic acid.

While these various products (X) find utility in the liquid state, these products are of particular significance in their solid state because in that state they are hard materials which can be readily ground into a powder which will not mass and consequently find utility as components in molding powders. Products (X) may also be converted to the solid infusible state by heating at a temperature between 250–300° F. under acidic or alkaline conditions such that the pH is no greater than 3.5 or no less than about 8. Said products (X) may also be acid polymerized to provide thickened or polymerized products in the intermediate state. These thickened or polymerized products are capable of being reacted with a "reagent" containing a reactive methylene group. Products (X) as well as said acid polymerized products thereof in the intermediate state, which in factory practice are produced at a pH no less than 1.0 may be reacted on either the acid or alkaline side with one of said "reagents" in the ratio range of 100–2 to 100–10 to provide solid infusible resins. I prefer, however, to carry out this reaction on the alkaline side because it proceeds much faster on the alkaline side. Among some of said "reagents" which may be employed are hexamethylene tetramine, furfuraldehyde, formaldehyde, paraformaldehyde, trioxane, glyoxal, polymerized glyoxal, acrolein, polymerized acrolein, acetaldehyde, etc., and I employ any of the alkalies such as sodium hydroxide, lime, etc., for maintaining the mass on the alkaline side. The following are certain specific examples merely for the purpose of illustrating the methods for providing some of the various products of the invention.

Example 1

600 lbs. of product A, 800 cc. of diethyl sulfate and 12 lbs. of paraformaldehyde are mixed together and the mass is heated to a temperature of approximately 300° F. whereupon an exothermic reaction sets in and the external heating is removed. The reaction is allowed to proceed as evidenced by the thickening of the mass. When the viscosity of the reaction mass is such that a sample thereof when cooled to room temperature is roughly 10–200 times that of the original mixture at the same temperature, there is added thereto about 100 lbs. of maleic acid whereupon cooling takes place. Consequently, external heat is required and this mass is maintained at a temperature of approximately 300° F. for reaction. The heating is discontinued and reaction stopped at any desirable stage but for some purposes may be stopped when a sample thereof cooled to room temperature is a hard, brittle solid. At this stage, the mass may be rapidly cooled to room temperature and at that temperature is a hard, brittle solid known as product 1, which may be ground to fine powder and which at a temperature of 300° F. is a liquid.

Example 2

Following the same procedure as that set forth in Example 1 and employing a furfural-mesityl oxide reaction mass (produced in accordance with the general method set forth in Example A) instead of product A, there was produced a hard, solid resinous reaction product known as product 2.

Example 3

Employing the same procedure as that set forth in Example 1 and substituting the furfural-acetonyl acetone reaction product made in accordance with the first part of Example 1 of U. S. Patent No. 2,156,317 for product A, there was produced a hard, solid, brittle resinous reaction product hereinafter known as product 3.

Example 4

Following the same procedure as that set forth in Example 1 and employing 100 parts of a liquid acid or alkaline polymer of product A in place of product A, the viscosity of said polymer being fifty times that of product A, there was produced a solid, brittle resinous reaction mass known as product 4.

Example 5

Employing the same procedure as that set forth in Example 1 but instead of product A an acid polymerized product of product B was employed, the liquid acid polymerized product of product B having a viscosity at 25° C. ten times that of the original product B, there was produced a solid, brittle resinous reaction mass known as product 5.

Example 6

Employing the same procedure as that set forth in Example 1 but instead of product A, a residual fraction of product A was used. The residual fraction was produced by heating distilling product A at temperatures in the range of 70–85° C. and under pressure of 0.1 mm. of mercury pressure until the weight of the residual fraction measured about 80% that of product A. The resultant reaction product produced was a solid, brittle resinous reaction mass known as product 6.

Examples 7–62

Employing the same procedure as that set forth in Example 1, and for product A therein substitute respective products A–I, A–II, HR–1, B, B–1, B–2, B–3, C, C–1, C–2, C–3, D, D–1, D–2, D–3, E–1 to E–6, F, G–1, G–2, H–1 to H–4 and the homopolymers thereof, which polymers are such that the viscosity at 25° C. of a solution of equal parts thereof and acetone is about 200% that of a like solution of the original corresponding product. Reaction products are obtained and at room temperature are solid and brittle and are hereinafter known as products 7–62.

Examples 63–70

Employing the same procedure as that set forth in Example 1, except for product A therein, substitute respectively products A–I, A–II, R–I and homopolymers, produced under either alkaline or acidic conditions, of A–I, A–II, R–I, furfural-mesityl oxide reaction masses and of furfural-methyl ethyl ketone reaction masses polymerized to such a degree that a solution thereof in an equal weight of acetone has a viscosity in centipoises at 25° C. about 300% that of a solution of the corresponding reaction mass in its original condition. The resultant reaction products were resinous solids at room temperature and are known as products 63–70.

Example 71

Employing the same procedure as that set forth in Example 1 but instead of product A, an acid polymerized product of product B having a viscosity of 25° C. fifty times that of the original product B, there was produced a solid brittle resinous reaction mass known as product 71.

Examples 72–76

Employing the same procedure as that set forth in Examples 1–4 and 71 except that the reactants are maintained at 300° F. for a much shorter period of time, namely, in the range of 15–30 minutes, there are produced reaction products which are liquid at room temperature and known as products 72–76.

Examples 77–120

Employing the same procedure as that set forth in Example 72 except for product A there is substituted the respective products B, B–1, B–2, C, C–1, C–2, D, D–1, D–2, E–1 to E–6, F, G–1, G–2, H–1 to H–4 and the polymers thereof whose viscosity in centipoises at 25° C. are 250% that of the unpolymerized corresponding material, to obtain liquid reaction products resinous in nature and known as products 77–120.

Example 121

Solid resinous reaction product 121 was obtained by employing the same procedure as that set forth in Example 1 but instead of product A, there was used: product A which has been (1) homopolymerized under either alkaline or acidic conditions so that the viscosity thereof at 25° C. is about 200 centipoises, then (2) this homopolymer was hydrogenated so that 20% of the carbon to carbon double bonds therein were saturated with hydrogen and subsequently (3) said partially hydrogenated product was homopolymerized under acidic conditions so that its viscosity increased to 600 cps. at 25° C.

All of these maleic acid resinous reaction products, examples of which are the illustrative products 1–121, are compounded with various (V) normally solid rubbery materials, such as natural rubber, homopolymers of butadiene, copolymers of butadiene and styrene, copolymers of butadiene and acrylonitrile and polymers of chloroprene to improve their impact, oil resistance and ozone resistance and also their ageing characteristics. The same procedure may be followed as is followed in the normal milling or other type of mixing used for such products (V) and the various accelerators, vulcanizers, fillers, etc. may be employed as is known to the art. The ratio of one or more products 1–121 to the material (V) is preferably in the range of 2 parts of the former to 1–200 parts of the latter. Products 72–120 are liquid and upon further heating at 300° F. may be converted to the state wherein at room temperature they are solid and products 1–71 and 121 at room temperature are solid and brittle and capable of liquification at 300° F. They, all, whether in the solid or liquid state, find utility in a variety of different fields when used either alone or in combination or reacted with other materials. They all find utility as components of molding compositions and products 1–71 and 121 especially in molding powders. They all find utility as binders for brake linings and clutch facings either alone or reacted with said "reagents"; also by themselves or their "reagent" containing reaction products employed as binders in grinding wheels; and also as binders for locking fibers such as paper fibers to each other either en masse or in lamination. The liquid products 72–120 especially and also products 1–71 find utility in the production of rubbery materials.

The following are certain specific examples given merely for the purpose of illustrating the method for providing the solid infusible resins of the invention.

*Example 122*

100 parts of products 1–121 were mixed with 5 parts of hexamethylene tetramine. The mixture was heated and maintained at a temperature of 250–350° F. for about 10 minutes to provide solid infusible resins.

*Example 123*

100 parts of any one or a combination of two or more of products 1–121 were mixed with 5 parts of lime and the mixture was heated and maintained at a temperature of 250–350° F. for 10 minutes to provide solid infusible resins.

*Example 124*

100 parts of any one or a combination of two or more of products 1–121 is heated and held at 250° F. Then there is added 6 parts of paraformaldehyde and 5 parts of diethyl sulphate and the mixture maintained at a temperature of 250–350° F. for about 15 minutes to provide solid infusible resins.

Products (X), normally in the liquid or solid state, may be combined with a resin such as phenol-aldehyde, cashew nut shell liquid-aldehyde, cardanol-aldehyde, residues of cashew nut shell liquid aldehyde, either of a thermoplastic or thermosetting nature in their intermediate state in the proportions by weight of 9 parts of product (X) to 1–90 parts of any one or a combination of two or more of said resins, either without or with a quantity of "Vinsol" or "Vinsol"-aldehyde resin measuring 5%–50% of the combined weights of said product (X) and said resinous combination of resin. These various combinations also find utility in the art of clutch facings, brake linings and other friction elements as well as in the field of binders in the arts of grinding wheels, sand paper and matter fiber paper.

Products (X), some of the novel products of this invention, are superior to the novel reaction products described and claimed in my copending application 358,197, filed May 28, 1953, and produced by reacting maleic acid with material (II). Comparative tests of the former with the latter establishes that the former either with or without admixture with one of said "reagents" may be heat converted or reacted in a much shorter period of time to the infusible state than may be the latter under the same conditions, and also such resultant infusible end products produced with the former are much tougher than such resultant infusible end products produced with the latter under the same conditions.

This application is a continuation-in-part of copending application Serial No. 464,184, filed October 22, 1954, and since abandoned, and which in turn is a continuation-in-part of my application Serial No. 297,161, filed July 3, 1952, and since abandoned, and which in turn is a continuation-in-part of my application Serial No. 191,935, filed October 24, 1950, and since abandoned.

I claim:

1. A resinous organic reaction product produced by heat reacting (I) maleic acid and (III) a resinous organic reaction material liquid at 325° F. and produced by reacting in the presence of an acidic catalyst (IV) an agent selected from the group consisting of formaldehyde, paraformaldehyde, trioxane, furfuraldehyde, glyoxal, polymerized glyoxal, acrolein, polymerized acrolein and acetaldehyde and (II) a material liquid at 325° F. and selected from the group consisting of (a) organic reaction masses produced by reacting furfural and a ketone having at least two hydrogen atoms on an alpha carbon, at least 5% by weight of said reaction mass being a resinous material; (b) residues of (a) produced by the heat distillation of (a) and measuring by weight at least 10% of (a); (c) monofurfurylidene ketone; (d) difurfurylidene ketone; (e) homopolymers of (a)–(d) respectively; (f) partially hydrogenated reaction masses, (a) residues (b) and homopolymers (e) respectively; (g) partially hydrogenated monofurfurylidene ketone; (h) partially hydrogenated difurfurylidene ketone; (i) residues of partially hydrogenated (a), said residues produced by the heat distillation thereof and measuring by weight at least 10% thereof and (j) homopolymers of (f)–(i) respectively, said materials (f), (g) and (h) produced by partially hydrogenating (a)–(e) respectively to saturate them with hydrogen to an extent equal to approximately 15%—65% of that required to saturate all of the carbon to carbon double bonds in said materials (a)–(e).

2. A resinous organic reaction product produced by heat reacting (I) maleic acid and (III) an organic reaction product liquid at 325° F. and produced by reacting in the presence of an acidic catalyst (IV) an agent selected from the group consisting of hexamethylene tetramine, formaldehyde, paraformaldehyde, trioxane, glyoxal, polymerized glyoxal, acrolein, polymerized acrolein and acetaldehyde and (II) difurfurylidene ketone.

3. A resinous organic reaction product produced by heat reacting (I) maleic acid and (III) an organic reaction product liquid at 325° F. and produced by reacting in the presence of an acidic catalyst (IV) an agent selected from the group consisting of hexamethylene tetramine, formaldehyde, paraformaldehyde, trioxane, glyoxal, polymerized glyoxal, acrolein, polymerized acrolein and acetaldehyde and (II) homopolymerized difurfurylidene ketone, said (II) being liquid at 325° F.

4. A resinous organic reaction product produced by heat reacting (I) maleic acid and (III) an organic reaction product liquid at 325° F. and produced by reacting in the presence of an acidic catalyst (IV) an agent selected from the group consisting of hexamethylene tetramine, formaldeydhe, paraformaldehyde, trioxane, glyoxal, polymerized glyoxal, acrolein, polymerized acrolein and acetaldehyde and (II) difurfurylidene ketone which has been saturated with hydrogen to the extent of approximately 15%—65% of the carbon to carbon double bonds therein.

5. A resinous organic reaction product produced by heat reacting (I) maleic acid and (III) an organic reaction product liquid at 325° F. and produced by reacting in the presence of an acidic catalyst (IV) an agent selected from the group consisting of hexamethylene tetramine, formaldehyde, paraformaldehyde, trioxane, glyoxal, polymerized glyoxal, acrolein, polymerized acrolein and acetaldehyde, and (II) difurfurylidene ketone which has been saturated with hydrogen to the extent of approximately 15%—65% of the carbon to carbon double bonds therein and homopolymerized, said (II) being liquid at 325° F.

6. A resinous organic reaction product produced by heat reacting (I) maleic acid and (III) an organic reaction product liquid at 325° F. and produced by reacting in the presence of an acidic catalyst (IV) an agent selected from the group consisting of hexamethylene tetramine, formaldehyde, paraformaldehyde, trioxane, glyoxal, polymerized glyoxal, acrolein, polymerized acrolein and acetaldehyde, and (II) an organic reaction mass produced by reacting furfural and a ketone having at least two hydrogen atoms on an alpha carbon, at least 5% by weight of said mass being a resinous material.

7. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 1.

8. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 2.

9. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 3.

10. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 4.

11. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 5.

12. A resinous reaction product produced by heat reacting a material selected from the group consisting of hexamethylene tetramine, formaldehyde, paraformaldehyde, trioxane, glyoxal, polymerized glyoxal, acrolein, polymerized acrolein and acetaldehyde and (X) a resinous reaction product as defined in claim 6.

13. The method comprising heat reacting (I) maleic acid and (III) a resinous organic reaction material liquid at 325° F. and produced by reacting in the presence of an acidic catalyst (IV) an agent selected from the group consisting of formaldehyde, paraformaldehyde, trioxane, furfuraldehyde, glyoxal, polymerized glyoxal, acrolein, polymerized acrolein and acetaldehyde and (II) a material liquid at 325° F. and selected from the group consisting of (a) organic reaction masses produced by reacting furfural and a ketone having at least two hydrogen atoms on an alpha carbon, at least 5% by weight of said reaction mass being a resinous material; (b) residues of (a) produced by the heat distillation of (a) and measuring by weight at least 10% of (a); (c) monofurfurylidene ketone; (d) difurfurylidene ketone; (e) homopolymers of (a)–(d) respectively; (f) partially hydrogenated reaction masses (a), residues (b) and homopolymers (e) respectively; (g) partially hydrogenated monofurfurylidene ketone; (h) partially hydrogenated difurfurylidene ketone; (i) residues of partially hydrogenated (a), said residues produced by the heat distillation thereof and measuring by weight at least 10% thereof and (j) homopolymers of (f)–(i) respectively, said materials (f), (g) and (h) produced by partially hydrogenating (a)–(e) respectively to saturate them with hydrogen to an extent equal to approximately 15%–65% of that required to saturate all of the carbon to carbon double bonds in said materials (a)–(e).

No references cited.